United States Patent
Hong et al.

(10) Patent No.: US 12,509,708 B2
(45) Date of Patent: Dec. 30, 2025

(54) LIPASE MUTANT AND USE THEREOF

(71) Applicant: ASYMCHEM LIFE SCIENCE (TIANJIN) CO., LTD., Tianjin (CN)

(72) Inventors: Hao Hong, Morrisville, NC (US); James Gage, Morrisville, NC (US); Yi Xiao, Tianjin (CN); Na Zhang, Tianjin (CN); Xuecheng Jiao, Tianjin (CN); Ru Jia, Tianjin (CN); Wenjing Liu, Tianjin (CN); Ye Liu, Tianjin (CN)

(73) Assignee: ASYMCHEM LIFE SCIENCE (TIANJIN) CO., LTD., Tianjin (CN)

( * ) Notice: Subject to any disclaimer, the term of this patent is extended or adjusted under 35 U.S.C. 154(b) by 323 days.

(21) Appl. No.: 18/261,864

(22) PCT Filed: Mar. 2, 2021

(86) PCT No.: PCT/CN2021/078741
§ 371 (c)(1),
(2) Date: Jul. 18, 2023

(87) PCT Pub. No.: WO2022/151568
PCT Pub. Date: Jul. 21, 2022

(65) Prior Publication Data
US 2024/0002890 A1 Jan. 4, 2024

(30) Foreign Application Priority Data
Jan. 18, 2021 (CN) .......................... 202110059694.6

(51) Int. Cl.
*C12P 7/62* (2022.01)
*C12N 9/20* (2006.01)

(52) U.S. Cl.
CPC .................. *C12P 7/62* (2013.01); *C12N 9/20* (2013.01); *C12Y 301/01003* (2013.01)

(58) Field of Classification Search
CPC .. C12Y 301/01003; C12N 15/70; C12N 9/20; C12P 7/40; C12P 7/62
See application file for complete search history.

(56) References Cited

FOREIGN PATENT DOCUMENTS

| | | |
|---|---|---|
| CN | 103773746 A | 5/2014 |
| CN | 103881992 A | 6/2014 |
| CN | 108504618 | 9/2018 |
| CN | 108642025 A | 10/2018 |
| CN | 109468301 A | 3/2019 |
| CN | 111117983 | 5/2020 |
| CN | 112375751 A | 2/2021 |
| WO | 2008065060 | 6/2008 |
| WO | 2011067349 | 6/2011 |
| WO | 2013010783 | 1/2013 |
| WO | 2017100240 | 6/2017 |
| WO | 2019154951 | 8/2019 |

OTHER PUBLICATIONS

Dong-Ming L., "A novel cold-active lipase from Candida albicans: cloning, expression and characterization of the recombinant enzyme," International Journal of Molecular Sciences, vol. 12, No. 6 (2011), pp. 3950-3965.

Han Z.-P., "Lipase immobilization and research progress in chiral resolution," Applied Chemical Industry, vol. 40, No. 10 (2011), pp. 1823-1827 and 1852.

Japanes Office Action Issued in Application No. 2023-542950, Issued Jul. 11, 2024, 6 Pages.

Supplementary European Search Report for PCT/CN2021/078741, Issued Oct. 30, 2024, 11 Pages.

Tsai, S-W., "Enantiopreference of Candida antarctica lipase B toward carboxylic acids: Substrate models and enantioselectivity thereof," Journal of Molecular Catalysis B: Enzymatic, vol. 127 (2016), pp. 98-116.

*Primary Examiner* — Tekchand Saidha
(74) *Attorney, Agent, or Firm* — Riverside Law LLP

(57) ABSTRACT

Provided are a lipase mutant and use thereof. The amino acid sequence of the lipase mutant has a sequence shown in SEQ ID NO: 1, that is, sites at which amino acid mutations occur include a V154L site.

13 Claims, No Drawings
Specification includes a Sequence Listing.

LIPASE MUTANT AND USE THEREOF

CROSS-REFERENCE TO RELATED APPLICATION

This application is the U.S. national stage application filed under 35 U.S.C. § 371 claiming benefit to International Patent Application No: PCT/CN2021/078741, filed Mar. 2, 2021, which claims priority to Chinese Patent Application No. 202110059694.6, filed to the China National Intellectual Property Administration on Jan. 18, 2021, the entire contents of each of which are incorporated herein in their entirety.

REFERENCE TO A "SEQUENCE LISTING" SUBMITTED AS A TEXT FILE

The present application hereby incorporates by reference the entire contents of the text file named "206418-0024-00US_SequenceListing" in ASCII format, which was created on Mar. 2, 2021, and is 4,355 bytes in size.

TECHNICAL FIELD

The present disclosure relates to the field of biotechnologies, in particular to a lipase mutant and use thereof.

BACKGROUND

Many chiral acid and alcohol compounds (for example α-substituted propionic acid compounds) are active, and are important chiral units in synthesis of chiral drugs. The resolution of acid, alcohol and ester chiral drugs is generally to synthesize corresponding racemates such as methyl ester, ethyl ester or propyl ester by a chemical method firstly, and then perform stereoselective hydrolysis by using lipase or esterase to obtain the chiral unit with a single enantiomeric configuration. For example, herbicide (R)-α-phenoxypropyl ester and anti-inflammatory drug (S)-phenylpropanol are both converted into a single active isomer by the stereoselectivity of the lipase.

With the high stereoselectivity, the lipase may catalyze chiral resolution and prepare organic synthesis intermediates such as single chiral alcohols, amines and esters (Lipase immobilization and research progress in chiral resolution [J]. Applied Chemical Industry, 2011, 40(10): 1823-1827). In the synthesis of chiral drugs, commonly used lipases include porcine pancreatic lipase, candida lipase, pseudomonas lipase and mucor lipase (Application of Biocatalysis in the Synthesis of Enantiopure Drugs [J]. Amino Acids & Biotic Resources, 2013, 35(4): 39-42).

For example: CN108642025A discloses that the specific enzyme activity of mutants M8A, L10A, D11A, L12A, and P17G derived from *Rhizopus chinensis* lipase is 1.1-2.4 times higher than that of the wild-type enzyme, and the 1,3-position selectivity of M8A, L10A, and T9A is 4.75-5 times higher than that of the wild-type enzyme.

For another example: CN109750013A discloses a mutant V131N derived from *Rhizopus chinensis* lipase. The mutant has ideal heat resistance characteristics, and its relative enzyme activity is about 66.12% while it is resistant to 120 min at 50° C., but the relative enzyme activity of the wild-type lipase is just remained by 28.24%. The time while the remaining half of the relative enzyme activity of the wild-type lipase is about 60 min at 60° C., and the corresponding mutant is only 25 min.

In industrial production, most of the wild-type lipases have the low catalytic efficiency, poor stereoselectivity and weak stability. While it is expressed in common engineering bacteria by genetic engineering means, there are defects such as low expression of target proteins, poor solubility and weak catalytic activity. Therefore, there are not many lipases that may really be widely used.

SUMMARY

The present disclosure aims to provide a lipase mutant and use thereof, as to improve the enzyme activity.

In order to achieve the above purpose, according to one aspect of the present disclosure, a lipase mutant is provided. The lipase mutant has an amino acid sequence obtained by the mutation of the amino acid sequence shown in SEQ ID NO: 1, and the mutation comprises a mutation site V154L.

Further, the mutation includes at least one of the following mutation sites: Q11L, T40S, T44S, Q23L, M72A, W113A, D134H/T/N, T138R, L140V/W/M/A/I, A141I/L/Q/T/V, P143A/G/I, L144G/H/P/R/S/T/D/A, L147P, S150N, P152L, S153P/T, V154K, T186A, I189L, V190I/T/Y/A, V221A, T256A, T259A, E269D, A281P, I285M/V/L/A, G307C, C311L, T316A, herein "/" means "or".

Further, the mutation comprises any one of the following mutation site combinations: V154L+I189L, V154L+L144G+L140V, V154L+P143A+L147P, V154L+I189L+L144G, V154L+I189L+L144G+L140V, V154L+I189L+L144G+L140W, V154L+I189D-L144G+L140M, V154L+I189L+L144G+I285M, V154L+I189L+L144G+I285V, V154L+I189L+L144G+L140V+I285M, V154L+I189L+L144G+L140V+I285V, V154L+I189L+L144G+P143A+L147P, V154L+I189L+L144G+L140V+P143A+L147P, V154L+I189L+L144G+T259A+V221A, V154L+I189L+L144G+Q23L+S150N, V154L+I189L+L144H, V154L+I189L144H+L140V, V154L+I189L144H+L140V+P143A+L147P, V154L+I189L144R+L140V, V154L+I189L144R+L140V+P143A+L147P, V154L+I189L144G+T40S, V154L+I189L144G+M72A, V154L+I189L+L144G+W113A, V154L+I189L144G+T138R, V154L+I189L+L144G+L140A, V154L+I189L144G+L140I, V154L+I189L144G+A141I, V154L+I189L144G+A141I, V154L+I189L+L144G+A141Q, V154L+I189L144G+A141T, V154L+I189L144G+A141V, V154L+I189L144G+S153P, V154L+I189L144G+S153I, V154L+I189L+L144G+P143G, V154L+I189L+L144G+P143I, V154L+I189L+L144H, V154L+I189L+L144G, V154L+I189L+L144R, V154L+I189L+L144S, V154L+I189L+L144T, V154K+I189L144G, V154M+I189L+L144G, V154L+I189L144G+I285I, V154L+I189L+L144G+I285A, V154L+I189L+L144G+D134H+T138R, V154L+I189L+L144T+A141L, V154L+I189L+L144G+S153P+L154K, V154L+I189L+S153T, V154L+I189L+S153P, V154L+I189L+D134T+T138R, V154L+I189L+D134N+T138R, V154L+I189L+D134+T138R, V154L+I189L+V190I, V154L+I189L+V190T, V154L+I189L+V190Y, V154L+I189L+V190A, V154L+I189L+A141L+L144T, V154L+I189L+A141V+L144 D, V154L+I189L+A141Q+L144P, V154L+I189L+A141I+L144G, V154L+I189L+A141I+L144H, V154L+I189L+L144A, V154L+I189L+A281P, V154L+I189L+L144G+T256A, V154L+I189L144G+T186A, V154L+I189L144G+E269D, V154L+I189L+L144G+G307C+C311L+T316A, V154L+I189L144G+T44S, V154L+I189L+L144G+P152L, V154L+I189L+L144G+Q11L+Q73H, V154L+I189L144G+T259A+V221A or V154L+I189L+L144R+P143A+L147P.

According to another aspect of the present disclosure, a DNA molecule is provided. The DNA molecule encodes any one of the above lipase mutants.

According to another aspect of the present disclosure, a recombinant plasmid is provided. The recombinant plasmid contains any one of the above DNA molecules.

Further, a vector used for the recombinant plasmid is pET-22a(+), pET-22b(+), pET-3a(+) pET-3d(+), pET-11a(+), pET-12a(+), pET-14b, pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19.

According to another aspect of the present disclosure, a host cell is provided. The host cell contains any one of the above recombinant plasmids.

Further, the host cell includes a prokaryotic cell or a eukaryotic cell; and preferably, the prokaryotic cell is *Escherichia coli* BL21 (DE3) cell or *Escherichia coli* DH5a competent cell, and the eukaryotic cell is yeast.

According to another aspect of the present disclosure, a method for producing a chiral acid is provided. The method includes a step of catalyzing hydrolysis reaction of an ester compound by a lipase, and the lipase is any one of the above lipase mutants.

Further, the ester compound is

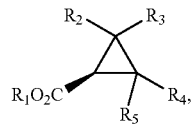

and is hydrolyzed into an acid compound

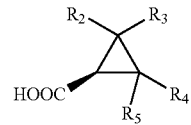

and an alcohol compound $HO-R_1$ by the lipase mutant, herein $R_1$ represents $CH_3$, $CH_2CH_3$, $CH_2-CH_2CH_3$ or $CHCH_3CH_3$, and $R_2$, $R_3$, $R_4$ and $R_5$ each independently represent H, F, Cl, Br, $CH_3$ or $CH_2CH_3$; and preferably, the ester compound is

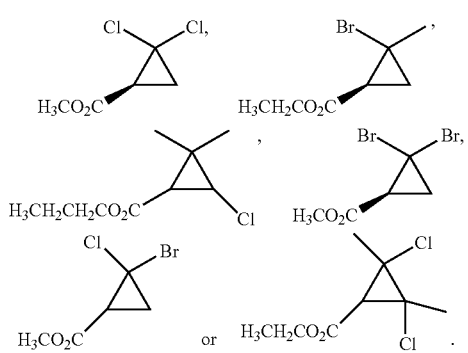

Further, pH of the hydrolysis reaction is 6.5~8.5, the reaction temperature is 20~37° C., the reaction volume is 10~50 times of the usage volume of a substrate, and the unit is mg:μL; and preferably, pH of the catalytic hydrolysis reaction of the lipase mutant is 8.5, the reaction temperature is 30° C., and the reaction volume is 10 times of the usage volume of the substrate (mg:μL).

The lipase mutant of the present disclosure achieves changes of the protein structure and function, its solubility expressed in *Escherichia coli* is significantly improved, and the catalytic activity of the enzyme is greatly improved. In practical applications, the usage amount of the enzyme is greatly reduced, the reaction volume is reduced, the difficulty of post-treatment is reduced, and it is suitable for industrial production.

DETAILED DESCRIPTION OF THE EMBODIMENTS

It should be noted that embodiments in the present application and features in the embodiments may be combined with each other without conflicting. The present disclosure is described in detail below in combination with the embodiments.

The present disclosure improves the specificity of lipase and reduces the usage amount of lipase by a method of directed evolution. The template amino acid (*Pseudomonas putida*, https://www.ncbi.nlm.nih.gov/, ACCESSION: P41365) is SEQ ID NO: 1 (MLPSGSD-PAFSQPKSVLDAGLTCQGASPSSVSKPILL-VPGTGTTGPQSFDSNWIPLSTQLGYTPC WISPPPFMLNDTQVNTEYMVNAITALY-AGSGNNKLPVLTWSQGGLVAQWGLTFFPSIR-SKVDRLM AFAPDYKGTVLAGPLDALA-VSAPSVWQQTTGSALTTALRNAGGLTQIVPTTNLY-SATDEIVQPQVS NSPLDSSYLFNGKNVQAQAVCG-PLFVIDHAGSLTSQFSYVVGRSALRSTIGQARSADY-GITDCNP LPANDLTPEQKVAAAALLAPA-AAAIVAGPKQNCEPDLMPYARPFAVGKRTCSGIVTP) the corresponding nucleotide sequence is SEQ ID NO: 2 (ATGCTGCCGAGTGGCAGTGACCCGGCGTT-TAGTCAGCCGAAGAGCGTGCTCGATGCCGGTC TGACGTGTCAAGGCGCCAGTCCAAGCAGCGT-TAGCAAACCGATTCTGCTGGTTCCGGGCACC GGTAC-CACGGGCCCGCAGAGCTTCGACAGCAACTGGAT-TCCGCTGAGTACCCAACTGGGCT ACACGCCGTGCTGGATCAGTCCACCACCGTT-CATGCTGAACGACACCCAAGTTAACACGGAG TACATGGTGAATGCGAT-CACCGCGCTGTACGCCGGCAGTGGTAACAATAA-ACTGCCGGTGCT CACGTGGAGT-CAAGGCGGTCTGGTGGCC-CAATGGGGTCTGACCTTCTTCCCGAGTATCCGCA GCAAAGTGGACCGTCT-GATGGCGTTCGCCCCGGACTA-CAAAGGCACCGTTCTGGCCGGTCC ACTG-GATGCGCTGGCCGTTAGTGCCCCGAGCGTTT-GGCAGCAGACGACCGGTAGTGCGCTG ACCACCGCCCTCCGTAATGCGGGTGGTCTGACC-CAAATCGTGCCGACGACCAATCTGTATAG CGC-CACGGACGAGATTGTGCAGCCACAAGT-TAGCAATAGCCCGCTGGACAGCAGCTACCTCT TCAATGGCAAAAACGTGCAAGCC-CAAGCCGTTTGTGGTCCGCTGTTCGTTATCGAT-CACGCC GGTAGTCTGACGAGCCAGTTCAGC-TATGTGGTTGGTCGCAGTGCGCTGCGTAGCAC- CACCG GTCAAGCCCGTAGCGCCGATTACGGCATTACCGACTGCAACCCGCTGCCAGCCAACGATCTGACCCCAGAACAGAAAGTTGCGGCCGCGGCGCTGCTGGCGCCAGCCGCGGCCGCCATTGTTGCCGGCCCGAAACAGAATTGCGAACCGGATCTGATGCCGTACGCGCGTCCATTCGCCGTGGGCAAACGCACGTGCAGCGGTATTGTTACCCCGTAA).

Firstly, a mutation site is introduced into the lipase by a mode of site-directed mutation, and the specificity of the mutant is detected to select the mutant with improved specificity. Compared with an initial template, the specificity of the mutant V154L is increased significantly. Subsequently, the mutant V154L is used as a template to continue the mutation in order to obtain a mutant with improved catalytic activity.

Herein, site-directed mutation: referring to introduction of required changes (usually changes that represent favorable directions) into a target DNA segment (either a genome or a plasmid) by a polymerase chain reaction (PCR) or other methods, including base addition, deletion, point mutation and the like. The site-directed mutation may rapidly and efficiently improve the character and representation of a target protein expressed by DNA, and is a very useful means in gene research work.

A method of introducing the site-directed mutation by the whole-plasmid PCR is simple and effective, and is more widely used at present. The principle thereof is that a pair of primers (forward and reverse) containing mutation sites are annealed with a template plasmid, "cyclic extension" is performed by using a polymerase, and the so-called cyclic extension is that the polymerase extends the primer according to the template, is returned to a 5'-terminal of the primer and terminated after one circle, and subjected to a cycle of repeatedly heated and annealed extension, this reaction is different from rolling circle amplification, and does not form multiple tandem copies. Extension products of the forward and reverse primers are paired to form an open-circle plasmid with an incision after annealed. A Dpn I enzyme-digested extension product, because the original template plasmid is derived from conventional *Escherichia coli*, is modified by dam methylation, and is sensitive to Dpn I so as to be shredded, but a plasmid with a mutant sequence synthesized in vitro is not cut because it is not methylated, so it may be successfully transformed in subsequent transformation, and a clone of a mutant plasmid may be obtained. The mutant plasmid is transformed into *Escherichia coli* cells, and then a crude enzyme is obtained by ultrasonic cell-break.

The mutant plasmid described above is transformed into the *Escherichia coli* cells and overexpressed in the *Escherichia coli*. Then the crude enzyme is obtained by the method of ultrasonic cell-break. The optimum condition for induced expression of the e amino acid dehydrogenase is: 25° C., and inducing in 0.1 mM isopropyl-β-d-thiogalactoside (IPTG) for 16 h.

By computer simulation analysis of the three-dimensional structure of the lipase by software, it is found that the mutation sites of the present disclosure are located near the substrate binding site.

According to a typical implementation of the present disclosure, a lipase mutant is provided. The lipase mutant has an amino acid sequence obtained by the mutation of the amino acid sequence shown in SEQ ID NO: 1, and the mutation comprises a mutation site V154L.

Preferably, the mutation includes at least one of the following mutation sites: Q11L, T40S, T44S, Q23L, M72A, W113A, D134H/T/N, T138R, L140V/W/M/A/I, A141I/L/Q/T/V, P143A/G/I, L144G/H/P/R/S/T/D/A, L147P, S150N, P152L, S153P/T, V154K, T186A, I189L, V190I/T/Y/A, V221A, T256A, T259A, E269D, A281P, I285M/V/L/A, G307C, C311L, T316A, herein "/" means "or".

More preferably, the mutation comprises any one of the following mutation site combinations: V154L+I189L, V154L+L144G+L140V, V154L+P143A+L147P, V154L+I189L+L144G, V154L+I189L144G+L140V, V154L+I189L144G+L140W, V154L+I189D-L144G+L140M, V154L+I189L144G+I285M, V154L+I189L+L144G+I285V, V154L+I189L144G+L140V+I285M, V154L+I189L144G+L140V+I285V, V154L+I189L144G+P143A+L147P, V154L+I189L144G+L140V+P143A+L147P, V154L+I189L+L144G+T259A+V221A, V154L+I189L144G+Q23L+S150N, V154L+I189L+L144H, V154L+I189L+L144H+L140V, V154L+I189L+L144H+L140V+P143A+L147P, V154L+I189L+L144R+L140V, V154L+I189L+L144R+L140V+P143A+L147P, V154L+I189L+L144G+T40S, V154L+I189D+L144G+M72A, V154L+I189L144G+W113A, V154L+I189L+L144G+I138R, V154L+I189L144G+L140A, V154L+I189D+L144G+L140I, V154L+I189D-L144G+A141I, V154L+I189L+L144G+A141L, V154L+I189L144G+A141Q, V154L+I189L+L144G+A141T, V154L+I189L144G+A141V, V154L+I189L+L144G+S153P, V154L+I189L+L144G+S153T, V154L+I189L+L144G+P143G, V154L+I189L+L144G+P143I, V154L+I189D-L144H, V154L+I189L+L144P, V154L+I189L+L144R, V154L+I189D-L144S, V154L+I189L+L144T, V154K+I189L144G, V154M+I189L+L144G, V154L+I189L+L144G+I285L, V154L+I189L144G+I285A, V154L+I189D+L144G+D134H+T138R, V154L+I189L+L144T+A141L, V154L+I189L144G+S153P+L154K, V154L+I189L+S153T, V154L+I189L+S153P, V154L+I189L+D134T+T138R, V154L+I189L+D134+T138R, V154L+I189L+D134+T138R, V154L+I189L+V190I, V154L+I189D+V190T, V154L+I189L+V190Y, V154L+I189L+V190A, V154L+I189L+A141L144 T, V154L+I189L+A141V+L144D, V154L+I189D-A141Q+L144P, V154L+I189L+A141I+L144G, V154L+I189L+A141I+L144H, V154L+I189L+L144A, V154L+I189L+A281P, V154L+I189L+L144G+T256A, V154L+I189L144G+T186A, V154L+I189L+L144G+E269D, V154L+I189D-L144G+G307C+C311L+T316A, V154L+I189L+L144G+T44S, V154L+I189L+L144G+P152L, V154L+I189L144G+Q11L+Q73H, V154L+I189D-L144G+T259A+V221A or V154L+I189L+L144R+P143A+L147P.

The lipase mutant of the present disclosure achieves changes of the protein structure and function, its solubility expressed in *Escherichia coli* is significantly improved, and the catalytic activity of the enzyme is greatly improved. In practical applications, the usage amount of the enzyme is greatly reduced, the reaction volume is reduced, the difficulty of post-treatment is reduced, and it is suitable for industrial production.

The lipase mutant of the present disclosure is based on the lipase shown in SEQ ID NO: 1, and is mutated by a method of site-directed mutation, as to change its amino acid sequence and achieve changes of the protein structure and function, and then the lipase with the above mutation site is obtained by a method of directional screening. Therefore, these lipase mutants have the advantage of greatly improving enzyme specificity, and the enzyme activity is also correspondingly improved, thus the usage amount of the enzyme is greatly reduced, and the cost in industrial production is reduced.

According to a typical implementation of the present disclosure, a DNA molecule is provided. The lipase encoded by the above DNA may improve the enzyme activity and stability, the amount of the enzyme added in the industrial production of amino acids may be reduced, and the difficulty of post-treatment is reduced.

The above DNA molecule of the disclosure may also exist in the form of an "expression cassette". The "expression cassette" refers to a linear or circular nucleic acid molecule that encompasses DNA and RNA sequences capable of guiding expression of a specific nucleotide sequence in an appropriate host cell. Generally, including a promoter which is effectively linked with a target nucleotide, it is optionally effectively linked with a termination signal and/or other control elements. The expression cassette may also include a sequence required for proper translation of the nucleotide sequence. A coding region usually encodes a target protein, but also encodes a target function RNA in a sense or antisense direction, for example an antisense RNA or an untranslated RNA. The expression cassette including a target polynucleotide sequence may be chimeric, which means that at least one of components thereof is heterologous to at least one of the other components thereof. The expression cassette may also be existent naturally, but obtained with effective recombinant formation for heterologous expression.

According to a typical embodiment of the present disclosure, a recombinant plasmid is provided. The recombinant plasmid contains any one of the above DNA molecules. The DNA molecule in the above recombinant plasmid is placed in an appropriate position of the recombinant plasmid, so that the above DNA molecule may be correctly and smoothly replicated, transcribed or expressed.

Although a qualifier used in the disclosure while the above DNA molecule is defined is "contain", it does not mean that other sequences which are not related to a function thereof may be arbitrarily added to both ends of the DNA sequence. Those skilled in the art know that in order to meet the requirements of recombination operations, it is necessary to add suitable enzyme digestion sites of a restriction enzyme at two ends of the DNA sequence, or additionally increase a start codon, a termination codon and the like, therefore, if the closed expression is used for defining, these situations may not be covered truly.

A term "plasmid" used in the present disclosure includes any plasmid, cosmid, bacteriophage or *agrobacterium* binary nucleic acid molecule in double-stranded or single-stranded linear or circular form, preferably a recombinant expression plasmid, which may be a prokaryotic expression plasmid or may be a eukaryotic expression plasmid, preferably the prokaryotic expression plasmid, in some embodiments, a vector used for the recombinant plasmid is selected from pET-22a(+), pET-22b(+), pET-3a(+), pET-3d(+), pET-11a(+), pET-12a(+), pET-14b, pET-15b(+), pET-16b(+), pET-17b(+), pET-19b(+), pET-20b(+), pET-21a(+), pET-23a (+), pET-23b(+), pET-24a(+), pET-25b(+), pET-26b(+), pET-27b(+), pET-28a(+), pET-29a(+), pET-30a(+), pET-31b (+), pET-32a(+), pET-35b(+), pET-38b(+), pET-39b(+), pET-40b(+), pET-41a(+), pET-41b(+), pET-42a(+), pET-43a (+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTro99A, pTwin1, pEZZ18, pKK232-8, pUC-18 or pUC-19. More preferably, the above recombinant plasmid is pET-22b(+).

According to a typical implementation of the present disclosure, a host cell is provided. The host cell contains any one of the above recombinant plasmids. The host cell applicable to the present disclosure includes but is not limited to a prokaryotic cell or a eukaryotic cell. Preferably the prokaryotic cell is *Escherichia coli* BL21 (DE3) cell or *Escherichia coli* DH5a competent cell, and the eukaryotic cell is yeast.

According to a typical implementation of the present disclosure, a method for producing a chiral acid is provided. The method includes a step of catalyzing hydrolysis reaction of an ester compound by a lipase, and the lipase is any one of the above lipase mutants. Because the above lipase of the present disclosure has the better specificity and even higher enzyme catalytic activity, the preparation of the chiral acid using the lipase mutant of the present disclosure may not only reduce the production cost, but also obtain a higher enantiomeric excess (ee) value of the amino acid.

The ester compound is

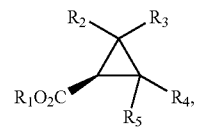

and is hydrolyzed into an acid compound

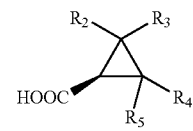

and an alcohol compound

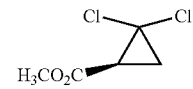

by the lipase mutant, herein $R_1$ represents $CH_3$, $CH_2CH_3$, $CH_2$—$CH_2CH_3$ or $CHCH_3CH_3$, and $R_2$, $R_3$, $R_4$ and $R_5$ each independently represent H, F, Cl, Br, $CH_3$ or $CH_2CH_3$.

According to a typical implementation of the present disclosure, the ester compound is

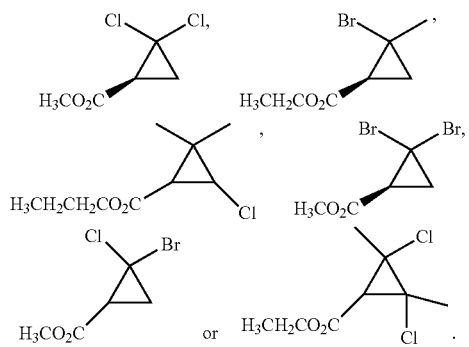

The mutant catalyzes ester reactions, and the transformation rates are different under the different reaction conditions. The mutant has the better catalytic reaction at pH including but not limited to pH 6.5, pH 7.5 and pH 8.5. The preferred pH 8.5 is the most suitable pH condition for the mutant. With the increase of the reaction temperature, the catalytic activity of the mutant is increased gradually at 20° C., 30° C. and 37° C. Since most of these reaction substrates may have apparent volatilization at 37° C., the preferred 30° C. is a relatively suitable reaction temperature. The enzyme catalytic activities of the mutant in different reaction volumes, including but not limited to 50 volumes/25 volumes/10 volumes, have a little difference, but the volume is smaller, it is more beneficial to the post-treatment, and it more meets the requirements of industrial production, so the preferred 10 V is the more reasonable reaction volume.

The beneficial effects of the present disclosure are further described below in combination with specific embodiments.

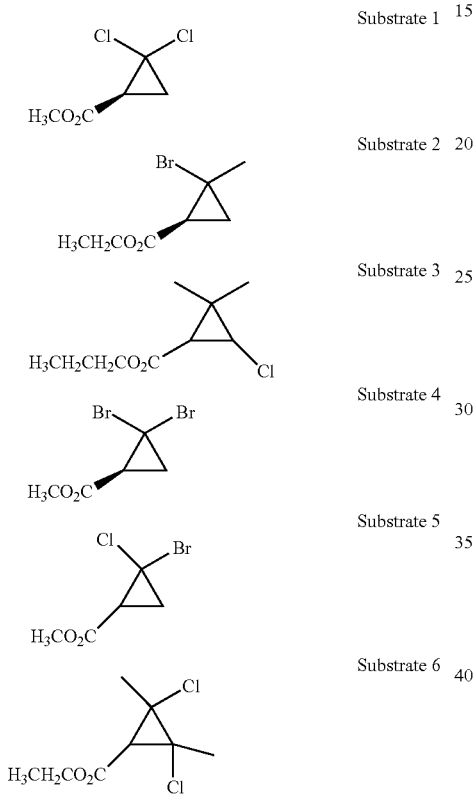

Substrate 1

Substrate 2

Substrate 3

Substrate 4

Substrate 5

Substrate 6

Embodiment 1

20 mg of Substrate 1/Substrate 2/Substrate 3 were each taken respectively, 2 mg of suspended lipase or its mutant bacterial sludge, and 0.1 M pH 8.5 Tris-Cl Buffer were successively added to a reaction system and the system was supplemented to 500 μL. It was reacted at 200 rpm and 30° C. of a constant temperature for 16 h. 2 volumes (1 mL) of acetonitrile was added into the system, it was mixed fully and evenly, and centrifuged at 12000 rpm for 3 min. It was observed whether there was layering. If there was layering, mixed solution of acetonitrile:purified water=1:1 was needed to be added until there was no layering, and finally 200 μL of a centrifugal supernatant was taken and added to 400 μL of the mixed solution of acetonitrile:purified water=1:1. After being mixed uniformly, a sample was sent to high performance liquid chromatography (HPLC) for detection of the transformation rate. The reaction characteristics of some mutants were shown below in Table 1 (the solubility conditions of protein expression are also attached):

TABLE 1

| | Activity | | | Protein solubility |
|---|---|---|---|---|
| Mutant | Substrate 1 | Substrate 2 | Substrate 3 | Distribution ratio of protein in supernatant and sediment |
| Female parent | − | − | − | * |
| V154L | ++ | ++ | ++ | **** |
| V154L + I189L | +++ | ++ | +++ | **** |
| V154L + L144G + L140V | ++ | ++ | +++ | *** |
| V154L + I285M | + | + | ++ | ** |
| V154L + P143A + L147P | + | + | ++ | *** |

Compared with the female parent (−), the times of activity increased is expressed by +, + represents increase by 10-50 times, ++ represents increase by 50-100 times, and +++ represents increase by 100-200 times or more.
* represents the solubility of a protein expressed in *Escherichia coli*, and the distribution ratio of the protein in centrifuged supernatant and sediment after ultrasonic fragmentation of bacterial cells: * represents the ratio from 1:10 to 1:5;  represents the ratio from 1:4 to 1:1; * represents the ratio from 1:1 to 2:1; and **** represents the ratio is from 2:1 to 4:1.

Embodiment 2

20 mg of Substrate 1/Substrate 4 were each taken respectively, 2 mg of suspended lipase or its mutant bacterial sludge, and 0.1 M pH 8.5 Tris-Cl Buffer were successively added to a reaction system and the system was supplemented to 500 μL. It was reacted at 200 rpm and 30° C. of a constant temperature for 16 h. 2 volumes (1 mL) of acetonitrile was added into the system, it was mixed fully and evenly, and centrifuged at 12000 rpm for 3 min. It was observed whether there was layering. If there was layering, mixed solution of acetonitrile:purified water=1:1 was needed to be added until there was no layering, and finally 200 μL of a centrifugal supernatant was taken and added to 400 μL of the mixed solution of acetonitrile:purified water=1:1. After being mixed uniformly, a sample was sent to HPLC for detection of the transformation rate. The reaction characteristics of some mutants were shown below in Table 2:

TABLE 2

| | Activity | |
|---|---|---|
| Mutant | Substrate 1 | Substrate 4 |
| Female parent | − | − |
| V154L + I189L + L144G | +++ | +++ |
| V154L + I189L + L144G + L140V | ++++ | +++ |
| V154L + I189L + L144G + L140W | ++ | ++ |
| V154L + I189L + L144G + L140M | +++ | ++ |
| V154L + I189L + L144G + I285M | ++ | ++ |
| V154L + I189L + L144G + I285V | +++ | ++ |
| V154L + I189L + L144G + L140V + I285M | ++++ | ++++ |
| V154L + I189L + L144G + L140V + I285V | +++ | +++ |
| V154L + I189L + L144G + P143A + L147P | ++ | ++ |
| V154L + I189L + L144G + L140V + P143A + L147P | ++ | ++ |
| V154L + I189L + L144G + T259A + V221A | + | + |
| V154L + I189L + L144G + Q23L + S150N | ++ | + |
| V154L + I189L + L144H | ++ | +++ |
| V154L + I189L + L144H + L140V | ++ | +++ |
| V154L + I189L + L144H + L140V + P143A + L147P | ++ | +++ |
| V154L + I189L + L144R + L140V | +++ | ++ |
| V154L + I189L + L144R + L140V + P143A + L147P | ++ | +++ |
| V154L + I189L + L144G + T40S | + | + |
| V154L + I189L + L144G + M72A | + | + |
| V154L + I189L + L144G + W113A | + | + |
| V154L + I189L + L144G + T138R | ++ | + |
| V154L + I189L + L144G + L140A | + | ++ |
| V154L + I189L + L144G + L140I | + | + |
| V154L + I189L + L144G + A141I | + | + |
| V154L + I189L + L144G + A141L | + | ++ |
| V154L + I189L + L144G + A141Q | ++ | + |
| V154L + I189L + L144G + A141T | + | + |

TABLE 2-continued

| Mutant | Activity Substrate 1 | Activity Substrate 4 |
|---|---|---|
| V154L + I189L + L144G + A141V | ++ | ++ |
| V154L + I189L + L144G + S153P | ++ | ++ |
| V154L + I189L + L144G + S153T | ++ | + |
| V154L + I189L + L144G + P143G | + | ++ |
| V154L + I189L + L144G + P143I | ++ | ++ |
| V154L + I189L + L144H | ++ | ++ |
| V154L + I189L + L144P | + | ++ |
| V154L + I189L + L144R | ++ | + |
| V154L + I189L + L144S | + | + |
| V154L + I189L + L144T | + | + |
| V154K + I189L + L144G | ++ | ++ |
| V154M + I189L + L144G | ++ | ++ |
| V154L + I189L + L144G + I285L | ++ | ++ |
| V154L + I189L + L144G + I285A | ++ | ++ |
| V154L + I189L + L144G + D134H + T138R | + | ++ |
| V154L + I189L + L144T + A141L | ++ | ++ |
| V154L + I189L + L144G + S153P + L154K | ++ | + |
| V154L + I189L + S153T | + | + |
| V154L + I189L + S153P | ++ | + |
| V154L + I189L + D134T + T138R | + | + |
| V154L + I189L + D134N + T138R | + | + |
| V154L + I189L + D134 + T138R | + | + |
| V154L + I189L + V190I | ++ | + |
| V154L + I189L + V190T | + | ++ |
| V154L + I189L + V190Y | + | + |
| V154L + I189L + V190A | + | ++ |
| V154L + I189L + A141L + L144T | ++ | ++ |
| V154L + I189L + A141V + L144D | ++ | ++ |

TABLE 2-continued

| Mutant | Activity Substrate 1 | Activity Substrate 4 |
|---|---|---|
| V154L + I189L + L144G + Q11L + Q73H | + | + |
| V154L + I189L + L144G + T259A + V221A | + | + |

Compared with the female parent (−), the times of activity increased is expressed by +, + represents increase by 50-100 times, ++ represents increase by 100-200 times, +++ represents increase by 200-400 times, and ++++ represents increase by more than 400 times.

Embodiment 3

20 mg of Substrate 1/Substrate 2/Substrate 3/Substrate 4/Substrate 5/Substrate 6 were each taken respectively, 2 mg of suspended lipase or bacterial sludge of some mutants, and 0.1 M pH 8.5 Tris-Cl Buffer were successively added to a reaction system and the system is supplemented to 500 μL. It was reacted at 200 rpm and 30° C. of a constant temperature for 16 h. 2 volumes (1 mL) of acetonitrile was added into the system, it was mixed fully and evenly, and centrifuged at 12000 rpm for 3 min. It was observed whether there was layering. If there was layering, mixed solution of acetonitrile:purified water=1:1 was needed to be added until there was no layering, and finally 200 μL of a centrifugal supernatant was taken and added to 400 μL of the mixed solution of acetonitrile:purified water=1:1. After being mixed uniformly, a sample was sent to HPLC for detection of the transformation rate. The reaction characteristics of some mutants were shown below in Table 3:

TABLE 3

| Mutant | Activity Substrate 1 | Substrate 2 | Substrate 3 | Substrate 4 | Substrate 5 | Substrate 6 |
|---|---|---|---|---|---|---|
| Female parent | − | − | − | − | − | − |
| V154L + I189L | ++ | ++ | ++ | + | ++ | + |
| V154L + I189L + L144G | +++ | +++ | ++++ | +++ | +++ | +++ |
| V154L + I189L + L144G + L140V | ++++ | +++ | ++++ | ++++ | ++++ | +++ |
| V154L + I189L + L144G + I285M | ++ | ++ | +++ | ++ | ++ | ++ |
| V154L + I189L + L144G + I285V | +++ | ++ | +++ | ++ | +++ | ++ |
| V154L + I189L + L144G + L140V + I285M | ++++ | ++++ | ++++ | +++ | ++++ | ++++ |
| V154L + I189L + L144G + T259A + V221A | + | + | ++ | + | ++ | + |
| V154L + I189L + L144G + Q23L + S150N | ++ | + | + | + | + | + |
| V154L + I189L + L144H | ++ | +++ | +++ | ++ | +++ | ++ |
| V154L + I189L + L144G + P143A + L147P | ++ | ++ | ++ | ++ | ++ | ++ |
| V154L + I189L + L144R | ++ | + | ++ | ++ | + | + |
| V154L + I189L + L144R + P143A + L147P | ++ | ++ | ++ | ++ | +++ | +++ |

Compared with the female parent (−), the times of activity increased is expressed by +, + represents increase by 50-100 times, ++ represents increase by 100-200 times, +++ represents increase by 200-400 times, and ++++ represents increase by more than 400 times.

TABLE 2-continued

| Mutant | Activity Substrate 1 | Activity Substrate 4 |
|---|---|---|
| V154L + I189L + A141Q + L144P | ++ | ++ |
| V154L + I189L + A141I + L144G | ++ | ++ |
| V154L + I189L + A141I + L144H | ++ | ++ |
| V154L + I189L + L144A | ++ | ++ |
| V154L + I189L + A281P | ++ | + |
| V154L + I189L + L144G + T256A | ++ | + |
| V154L + I189L + L144G + T186A | ++ | + |
| V154L + I189L + L144G + E269D | + | + |
| V154L + I189L + L144G + G307C + C311L + T316A | + | + |
| V154L + I189L + L144G + T44S | ++ | ++ |
| V154L + I189L + L144G + P152L | + | + |

Embodiment 4

20 mg/100 mg/1 g of Substrate 2/Substrate 5/Substrate 6 were each taken respectively, lipase or its mutant bacterial sludge equivalent to 0.1 wt (mass ratio), and 0.1 M pH 8.5 Tris-Cl Buffer were successively added to a reaction system and the system was supplemented to 25 V. It was reacted at 200 rpm and 30° C. of a constant temperature for 16 h. 2 reaction volumes of acetonitrile was added into the system, it was mixed fully and evenly, and centrifuged at 12000 rpm for 3 min. It was observed whether there was layering. If there was layering, mixed solution of acetonitrile:purified water=1:1 was needed to be added until there was no layering, and finally 200 μL of a centrifugal supernatant was taken and added to 400 μL of the mixed solution of acetonitrile:purified water=1:1. After being mixed uniformly, a sample was sent to HPLC for detection of the transformation rate. 3 better mutants were selected to amplify from 20 mg to 100 mg and then to 1 g step by step, their transformation activities were significantly improved compared with the female parent, and the specific reaction characteristics were shown below in Table 4:

TABLE 4

| Mutant | | | Female parent | V154L + I189L + L144G | V154L + I189L + L144G + L140V | V154L + I189L + L144G + L140V + I285M |
|---|---|---|---|---|---|---|
| Activity | Substrate 2 | 20 mg | − | ++ | +++ | ++++ |
| | | 100 mg | − | ++ | +++ | ++++ |
| | | 1 g | − | ++ | +++ | ++++ |
| | Substrate 5 | 20 mg | − | ++ | ++++ | ++++ |
| | | 100 mg | − | ++ | ++++ | ++++ |
| | | 1 g | − | ++ | ++++ | ++++ |
| | Substrate 6 | 20 mg | − | + | ++ | +++ |
| | | 100 mg | − | + | ++ | +++ |
| | | 1 g | − | + | ++ | +++ |

Compared with the female parent (−), the times of activity increased is expressed by +, + represents increase by 50-100 times, ++ represents increase by 100-200 times, +++ represents increase by 200-400 times, and ++++ represents increase by more than 400 times.

Embodiment 5 mg of Substrate 2/Substrate 5 were each taken respectively, about 2 mg of suspended lipase or its mutant bacterial sludge, and 0.1 M of Tris-Cl Buffer with different pH (pH 6.6/7.5/8.5) were successively added to a reaction system, different reaction volumes of 50 V/25 V/10 V were made and different temperatures such as 20° C./30° C./37° C. were set. It was reacted at 200 rpm for 16 h. 2 volumes of acetonitrile was added into the system, it was mixed fully and evenly, and centrifuged at 12000 rpm for 3 min. It was observed whether there was layering. If there was layering, mixed solution of acetonitrile:purified water=1:1 was needed to be added until there was no layering, and finally 200 μL of a centrifugal supernatant was taken and added to 400 μL of the mixed solution of acetonitrile:purified water=1:1. After being mixed uniformly, a sample was sent to HPLC for detection of the transformation rate. It may be seen from the transformation results of these 3 mutants to 2 substrates under the different reaction conditions that: pH 8.5 is a better reaction pH value; the catalytic reaction is accelerated with the increase of the temperature, but since most of the reaction substrates may have apparent volatilization at 37° C., 30° C. is the appropriate reaction temperature; and the transformation activities of the different reaction volumes (50 V/25 V/10 V) has a little difference, the volume is smaller, it is more beneficial to the post-treatment, and it more meets the requirements of industrial production. The specific reaction characteristics were shown below in Table 5:

TABLE 5

| Mutant | | Female parent | V154L + I189L + L144G | V154L + I189L + L144G + L140V | V154L + I189L + L144G + L140V + I285M |
|---|---|---|---|---|---|
| Activity | Substrate 2 pH 6.5 | − | ++ | ++ | +++ |
| | pH 7.5 | − | +++ | ++ | +++ |
| | pH 8.5 | − | +++ | +++ | ++++ |
| | 20° C. | − | + | + | ++ |

TABLE 5-continued

| Mutant | | Female parent | V154L + I189L + L144G | V154L + I189L + L144G + L140V | V154L + I189L + L144G + L140V + I285M |
|---|---|---|---|---|---|
| | 30° C. | − | ++ | +++ | +++ |
| | 37° C. | − | +++ | ++++ | ++++ |
| | 50 V | − | +++ | +++ | ++++ |
| | 25 V | − | +++ | +++ | ++++ |
| | 10 V | − | +++ | +++ | ++++ |
| Substrate 5 | pH 6.5 | − | ++ | ++ | +++ |
| | pH 7.5 | − | +++ | ++ | +++ |
| | pH 8.5 | − | +++ | +++ | ++++ |
| | 20° C. | − | + | + | ++ |
| | 30° C. | − | ++ | +++ | +++ |
| | 37° C. | − | +++ | ++++ | ++++ |
| | 50 V | − | +++ | +++ | ++++ |
| | 25 V | − | +++ | +++ | ++++ |
| | 10 V | − | +++ | +++ | ++++ |

Compared with the female parent (−), the times of activity increased is expressed by +, + represents increase by 50-100 times, ++ represents increase by 100-200 times, +++ represents increase by 200-400 times, and ++++ represents increase by more than 400 times.

Embodiment 6

20 mg of Substrate 1/Substrate 2/Substrate 3/Substrate 4/Substrate 5/Substrate 6 were each taken respectively, 2 mg of suspended lipase or bacterial sludge of some mutants, and 0.1 M pH 8.5 Tris-Cl Buffer were successively added to a reaction system and the system was supplemented to 500 μL. It was reacted at 200 rpm and 30° C. of a constant temperature for 16 h. 6 M hydrochloric acid was added into the reaction system to adjust pH between 2-3, and 1 mL of ethyl acetate (EA) was added to perform an extraction reaction fully. It was centrifuged at 12000 rpm for 10 min, water was removed from a supernatant with anhydrous magnesium sulfate, it was centrifuged at 12000 rpm for 10 min, then a supernatant was taken and sent to gas chromatography (GC) for detection. The enantiomeric excess (e.e.) value of a product is a very important indicator in the process of industrial production. This patent should guarantee the e.e. value of the product to the maximum extent while modifying the amino acid sequence of the protein and greatly improving the activity, and the e.e. value is also slightly increased while the stability is maintained, at least not decreased. The specific reaction characteristics of some mutants were shown below in Table 6:

TABLE 6

| Mutant | ee value | | | | | |
|---|---|---|---|---|---|---|
| | Substrate 1 | Substrate 2 | Substrate 3 | Substrate 4 | Substrate 5 | Substrate 6 |
| Female parent | * | * | * | * | * | * |
| V154L | ** | ** | * | ** | * | ** |
| V154L + L144G + L140V | ** | ** | * | * | ** | * |
| V154L + P143A + L147P | * | ** | ** | ** | * | * |
| V154L + I189L | ** | ** | ** | ** | ** | ** |
| V154L + I189L + L144G | ** | ** | ** | ** | ** | ** |
| V154L + I189L + L144G + L140V | ** | ** | ** | ** | ** | ** |
| V154L + I189L + L144G + L140W | ** | ** | ** | ** | ** | ** |
| V154L + I189L + L144G + L140M | ** | ** | ** | ** | ** | ** |
| V154L + I189L + L144G + I285M | ** | ** | ** | ** | ** | ** |
| V154L + I189L + L144G + I285V | ** | ** | ** | ** | ** | ** |
| V154L + I189L + L144G + L140V + I285M | ** | ** | ** | ** | ** | ** |
| V154L + I189L + L144G + L140V + I285V | ** | ** | ** | ** | ** | ** |
| V154L + I189L + L144G + T259A + V221A | ** | ** | ** | ** | ** | ** |
| V154L + I189L + L144G + Q23L + S150N | ** | ** | ** | ** | ** | ** |
| V154L + I189L + L144H | ** | ** | ** | ** | ** | ** |
| V154L + I189L + L144G + A141I | ** | ** | ** | ** | ** | ** |
| V154L + I189L + L144G + A141V | ** | ** | ** | ** | ** | ** |
| V154L + I189L + L144G + P143A + L147P | ** | ** | ** | ** | ** | ** |
| V154L + I189L + L144R | ** | ** | ** | ** | ** | ** |
| V154L + I189L + L144G + S153T | ** | ** | ** | ** | ** | ** |
| V154L + I189L + L144G + P143G | ** | ** | ** | ** | ** | ** |
| V154L + I189L + V190Y | ** | ** | ** | ** | ** | ** |
| V154L + I189L + V190A | ** | ** | ** | ** | ** | ** |
| V154L + I189L + L144R + P143A + L147P | ** | ** | ** | ** | ** | ** |

* represents that the e.e. value is 97%-99%, and ** represents that the e.e. value is more than 99%.

In the present disclosure, it is verified by a large number of experiments that the amount of the substrate is gradually increased, it is finally proved that the transformation rate of the catalytic reaction of the lipase mutant of the present disclosure is increased from the initial <0.5% to 96% and even reaches 99%, and the e.e. value of most products remains >99% (a small number of the e.e. values are between 97% and 99%), the production cycle is greatly shortened, the labor and material costs are reduced.

The above are only preferred embodiments of the present disclosure, and are not intended to limit the present disclosure. For those skilled in the art, the present disclosure may have various modifications and changes. Any modifications, equivalent replacements, improvements and the like made within the spirit and principle of the present disclosure shall be included in the scope of protection of the present disclosure.

What is claimed is:

1. A lipase mutant having an amino acid sequence obtained by the mutation of the amino acid sequence shown in SEQ ID NO: 1, and the mutation comprises a mutation site V154L.

2. The lipase mutant as claimed in claim 1, wherein the mutation comprises any one of the following mutation site combinations: V154L+I189L, V154L+L144G+L140V, V154L+P143A+L147P, V154L+I189L+L144G, V154L+I189L+L144G+L140V, V154L+I189L+L144G+L140W, V154L+I189L+L144G+L140M, V154L+I189L+L144G+I285M, V154L+I189L+L144G+I285V, V154L+I189L+L144G+L140V+I285M, V154L+I189L+L144G+L140V+I285V, V154L+I189L+L144G+P143A+L147P, V154L+I189L+L144G+L140V+P143A+L147P, V154L+I189L+L144G+T259A+V221A, V154L+I189L+L144G+Q23L+S150N, V154L+I189L+L144H, V154L+I189L+L144H+L140V, V154L+I189L+L144H+L140V+P143A+L147P, V154L+I189L+L144R+L140V, V154L+I189L+L144R+L140V+P143A+L147P, V154L+I189L+L144G+T40S, V154L+I189L+L144G+M72A, V154L+I189L+L144G+W113A, V154L+I189L+L144G+T138R, V154L+I189L+L144G+L140A, V154L+I189L+L144G+L140I, V154L+I189L+L144G+A141I, V154L+I189L+L144G+A141L, V154L+I189L+L144G+A141Q, V154L+I189L+L144G+A141T, V154L+I189L+L144G+A141V, V154L+I189L+L144G+S153P, V154L+I189L+L144G+S153T, V154L+I189L+L144G+P143G, V154L+I189L+L144G+P143I, V154L+I189L+L144H, V154L+I189L+L144P, V154L+I189L+L144R, V154L+I189L+L144S, V154L+I189L+L144T, V154K+I189L+L144G, V154M+I189L+L144G, V154L+I189L+L144G+I285L, V154L+I189L+L144G+I285A, V154L+I189L+L144G+D134H+T138R, V154L+I189L+L144T+A141L, V154L+I189L+L144G+S153P+L154K, V154L+I189L+S153T, V154L+I189L+S153P, V154L+I189L+D134T+T138R, V154L+I189L+D134N+T138R, V154L+I189L+D134+T138R, V154L+I189L+V190I, V154L+I189L+V190T, V154L+I189L+V190Y, V154L+I189L+V190A, V154L+I189L+A141L+L144T, V154L+I189L+A141V+L144D, V154L+I189L+A141Q+L144P, V154L+I189L+A141I+L144G, V154L+I189L+A141I+L144H, V154L+I189L+L144A, V154L+I189L+A281P, V154L+I189L+L144G+T256A, V154L+I189L+L144G+T186A, V154L+I189L+L144G+E269D, V154L+I189L+L144G+G307C+C311L+T316A, V154L+I189L+L144G+T44S, V154L+I189L+L144G+P152L, V154L+I189L+L144G+Q11L+Q73H, V154L+I189L+L144G+T259A+V221A or V154L+I189L+L144R+P143A+L147P.

3. A DNA molecule encoding the lipase mutant as claimed in claim 1.

4. A recombinant plasmid containing the DNA molecule as claimed in claim 3.

5. The recombinant plasmid as claimed in claim 4, wherein the recombinant plasmid is pET-22a(+), pET-22b(+), pET-3a(+), pET-3d(+), pET-11a(+), pET-12a(+), pET-14b, pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19.

6. A host cell comprising the recombinant plasmid as claimed in claim 3.

7. The host cell as claimed in claim 6, wherein the host cell comprises a prokaryotic cell or a eukaryotic cell.

8. The host cell according to claim 7, wherein the prokaryotic cell is *Escherichia coli* BL21(DE3) cell or *Escherichia coli* DH5a competent cell, and the eukaryotic cell is yeast.

9. A method for producing a chiral acid, comprising a step of catalyzing hydrolysis reaction of an ester compound by a lipase, wherein the lipase is the lipase mutant as claimed in claim 1.

10. The method as claimed in claim 9, wherein the ester compound is

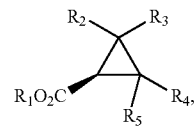

and hydrolyzed by the lipase mutant into an acid compound

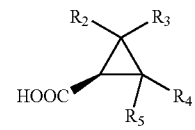

and an alcohol compound HO—$R_1$, wherein, $R_1$ represents $CH_3$, $CH_2CH_3$, $CH_2$—$CH_2CH_3$ or $CHCH_3CH_3$, and $R_2$, $R_3$, $R_4$ and $R_5$ respectively and independently represent H, F, Cl, Br, $CH_3$ or $CH_2CH_3$.

11. The method as claimed in claim 10, wherein the ester compound is

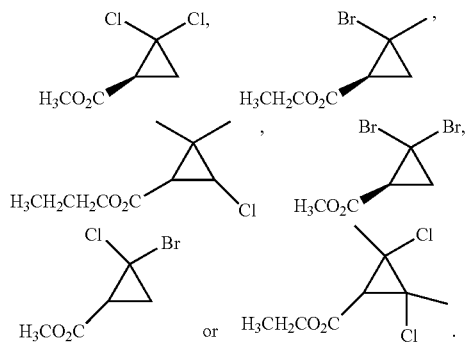

12. The method as claimed in claim 11, wherein a pH of the hydrolysis reaction is 6.5-8.5, a reaction temperature is 20-37° C., a reaction volume is 10-50 times of the usage volume of a substrate, and a unit is mg:μL.

13. The method as claimed in claim 12, wherein the pH of the hydrolysis reaction is 8.5, the reaction temperature is 30° C., the reaction volume is 10 times of the usage volume of a substrate, and the unit is mg:μL.

* * * * *

SEQUENCE LISTING

<160> NUMBER OF SEQ ID NOS: 2

<210> SEQ ID NO 1
<211> LENGTH: 318
<212> TYPE: PRT
<213> ORGANISM: Pseudomonas putida

<400> SEQUENCE: 1

Met Leu Pro Ser Gly Ser Asp Pro Ala Phe Ser Gln Pro Lys Ser Val
1               5                   10                  15

Leu Asp Ala Gly Leu Thr Cys Gln Gly Ala Ser Pro Ser Ser Val Ser
                20                  25                  30

Lys Pro Ile Leu Leu Val Pro Gly Thr Gly Thr Thr Gly Pro Gln Ser
            35                  40                  45

Phe Asp Ser Asn Trp Ile Pro Leu Ser Thr Gln Leu Gly Tyr Thr Pro
        50                  55                  60

Cys Trp Ile Ser Pro Pro Pro Phe Met Leu Asn Asp Thr Gln Val Asn
65                  70                  75                  80

Thr Glu Tyr Met Val Asn Ala Ile Thr Ala Leu Tyr Ala Gly Ser Gly
                85                  90                  95

Asn Asn Lys Leu Pro Val Leu Thr Trp Ser Gln Gly Gly Leu Val Ala
            100                 105                 110

```
Gln Trp Gly Leu Thr Phe Phe Pro Ser Ile Arg Ser Lys Val Asp Arg
            115                 120                 125

Leu Met Ala Phe Ala Pro Asp Tyr Lys Gly Thr Val Leu Ala Gly Pro
        130                 135                 140

Leu Asp Ala Leu Ala Val Ser Ala Pro Ser Val Trp Gln Gln Thr Thr
145                 150                 155                 160

Gly Ser Ala Leu Thr Thr Ala Leu Arg Asn Ala Gly Gly Leu Thr Gln
                165                 170                 175

Ile Val Pro Thr Thr Asn Leu Tyr Ser Ala Thr Asp Glu Ile Val Gln
            180                 185                 190

Pro Gln Val Ser Asn Ser Pro Leu Asp Ser Ser Tyr Leu Phe Asn Gly
        195                 200                 205

Lys Asn Val Gln Ala Gln Ala Val Cys Gly Pro Leu Phe Val Ile Asp
    210                 215                 220

His Ala Gly Ser Leu Thr Ser Gln Phe Ser Tyr Val Val Gly Arg Ser
225                 230                 235                 240

Ala Leu Arg Ser Thr Thr Gly Gln Ala Arg Ser Ala Asp Tyr Gly Ile
                245                 250                 255

Thr Asp Cys Asn Pro Leu Pro Ala Asn Asp Leu Thr Pro Glu Gln Lys
            260                 265                 270

Val Ala Ala Ala Leu Leu Ala Pro Ala Ala Ala Ile Val Ala
        275                 280                 285

Gly Pro Lys Gln Asn Cys Glu Pro Asp Leu Met Pro Tyr Ala Arg Pro
        290                 295                 300

Phe Ala Val Gly Lys Arg Thr Cys Ser Gly Ile Val Thr Pro
305                 310                 315

<210> SEQ ID NO 2
<211> LENGTH: 957
<212> TYPE: DNA
<213> ORGANISM: Pseudomonas putida

<400> SEQUENCE: 2
atgctgccga gtggcagtga cccggcgttt agtcagccga agagcgtgct cgatgccggt    60
ctgacgtgtc aaggcgccag tccaagcagc gttagcaaac cgattctgct ggttccgggc   120
accggtacca cgggccccgca gagcttcgac agcaactgga ttccgctgag tacccaactg   180
ggctacacgc cgtgctggat cagtccacca ccgttcatgc tgaacgacac ccaagttaac   240
acggagtaca tggtgaatgc gatcaccgcg ctgtacgccg gcagtggtaa caataaactg   300
ccggtgctca cgtggagtca aggcggtctg gtggcccaat ggggtctgac cttcttcccg   360
agtatccgca gcaaagtgga ccgtctgatg gcgttcgccc cggactacaa aggcaccgtt   420
ctggccggtc cactggatgc gctggccgtt agtgccccga gcgtttggca gcagacgacc   480
ggtagtgcgc tgaccaccgc cctccgtaat gcgggtggtc tgacccaaat cgtgccgacg   540
accaatctgt atagcgccac ggacgagatt gtgcagccac aagttagcaa tagcccgctg   600
gacagcagct acctcttcaa tggcaaaaac gtgcaagccc aagccgtttg tggtccgctg   660
ttcgttatcg atcacgccgg tagtctgacg agccagttca gctatgtggt tggtcgcagt   720
gcgctgcgta gcaccaccgg tcaagcccgt agcgccgatt acggcattac cgactgcaac   780
ccgctgccag ccaacgatct gaccccagaa cagaaagttg cggccgcggc gctgctggcg   840
ccagccgcgg ccgccattgt tgccggcccg aaacagaatt gcgaaccgga tctgatgccg   900
tacgcgcgtc cattcgccgt gggcaaacgc acgtgcagcg gtattgttac cccgtaa      957
```